E. T. SILVIUS.
FILING APPLIANCE.
APPLICATION FILED AUG. 14, 1914.
1,263,614.
Patented Apr. 23, 1918.
4 SHEETS—SHEET 3.
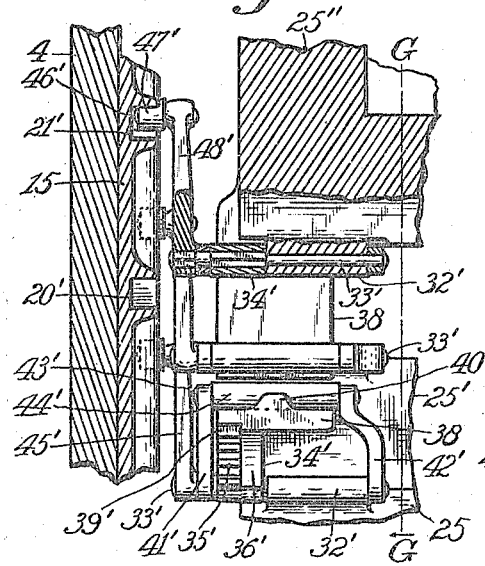
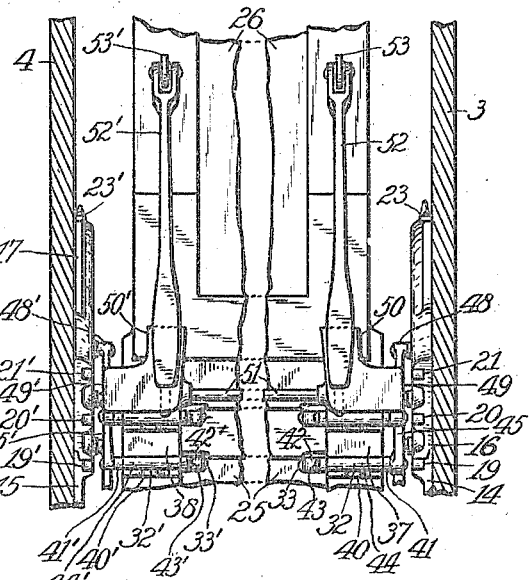
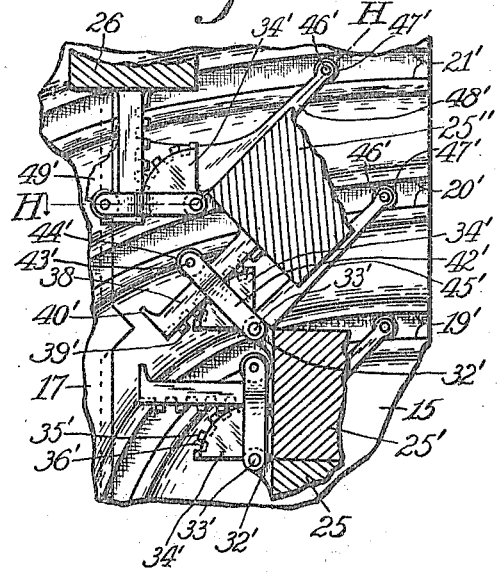
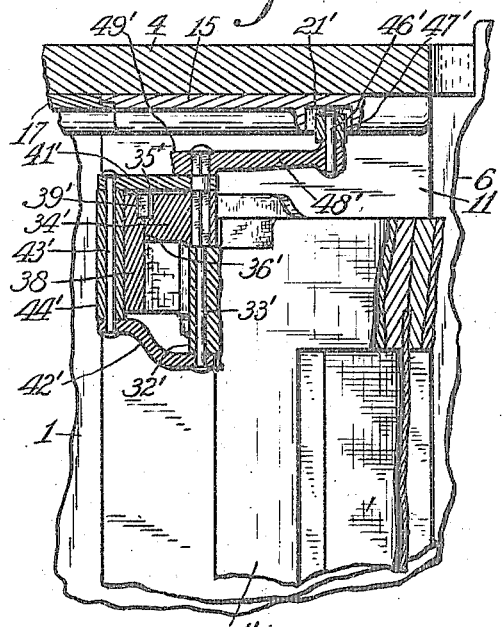
WITNESSES:
J. H. Gardner
M. E. Sparrow
INVENTOR:
Ellis T. Silvius E. T. SILVIUS.
FILING APPLIANCE.
APPLICATION FILED AUG. 14, 1914.
1,263,614.
Patented Apr. 23, 1918.
4 SHEETS—SHEET 4.
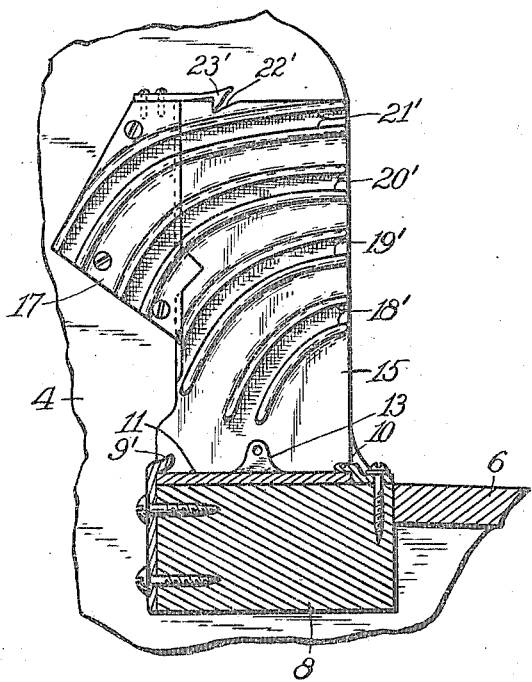
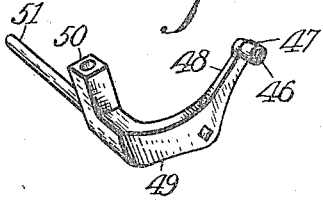
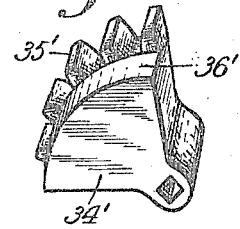
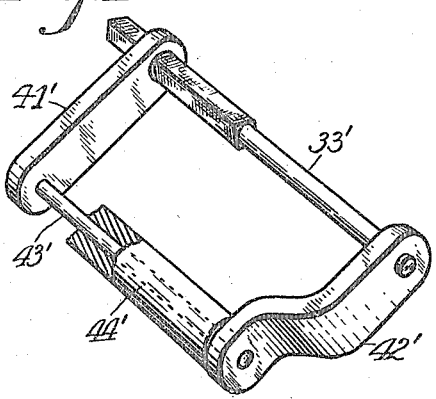
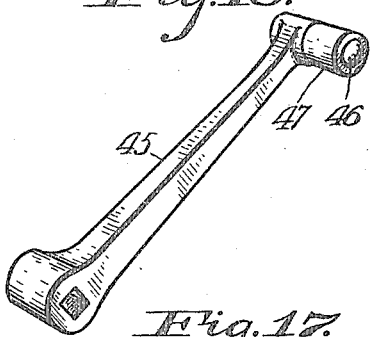
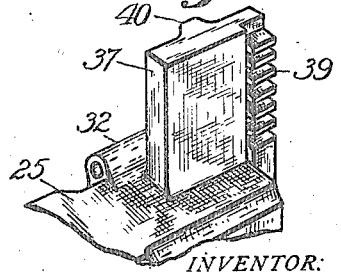
WITNESSES:
J. H. Gardner.
M. E. Sparrow.
INVENTOR:
Ellis T. Silvius.

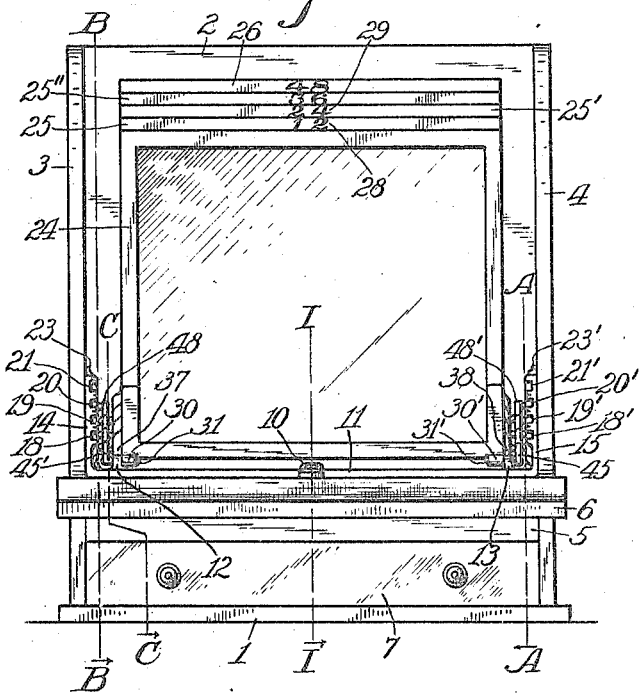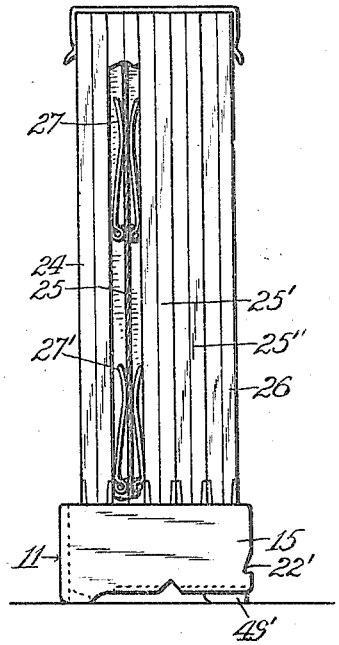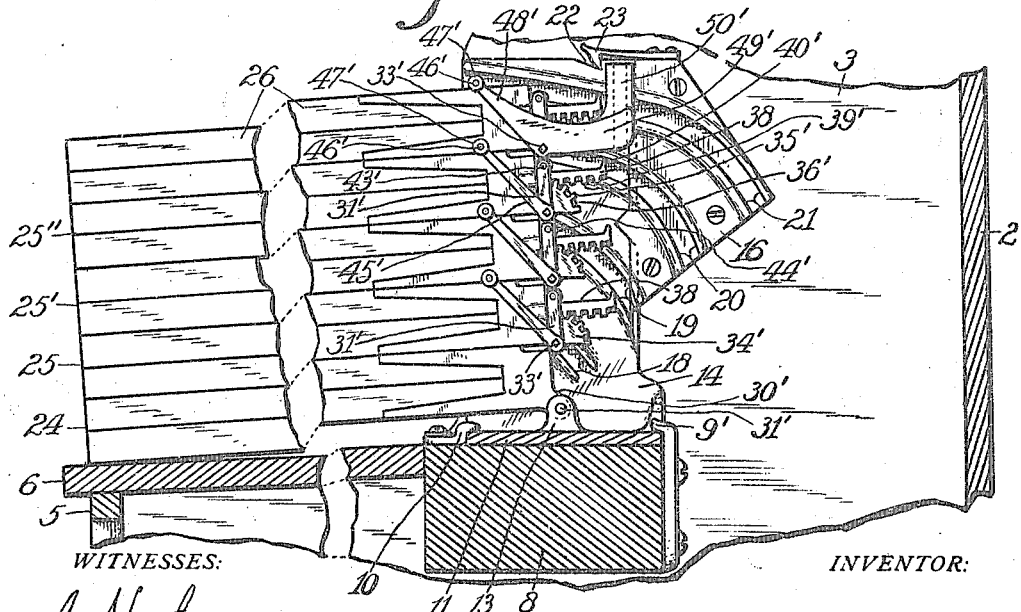

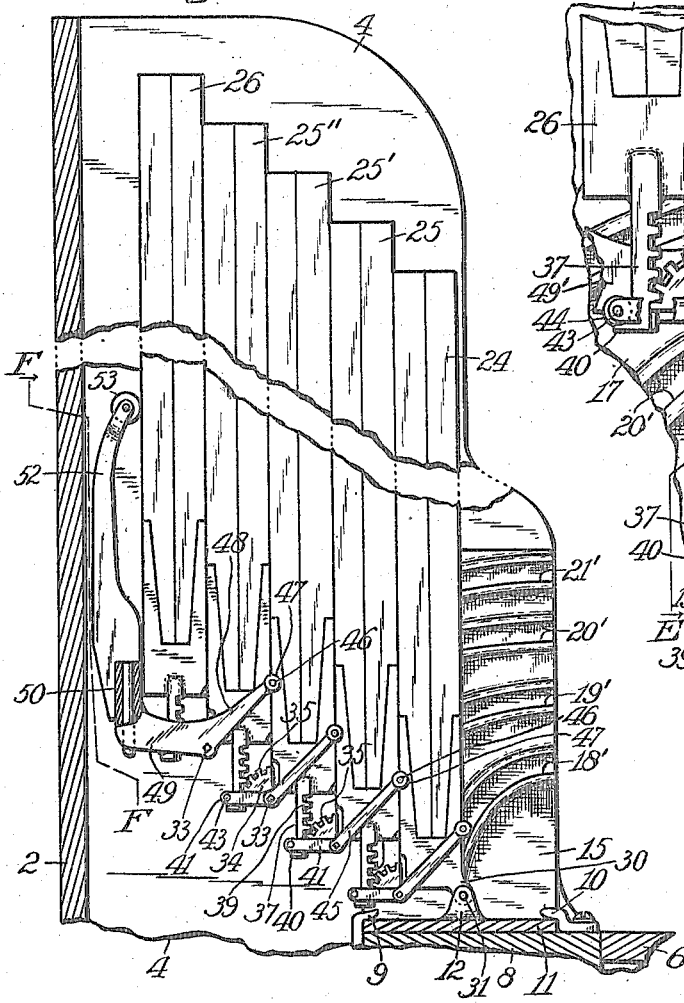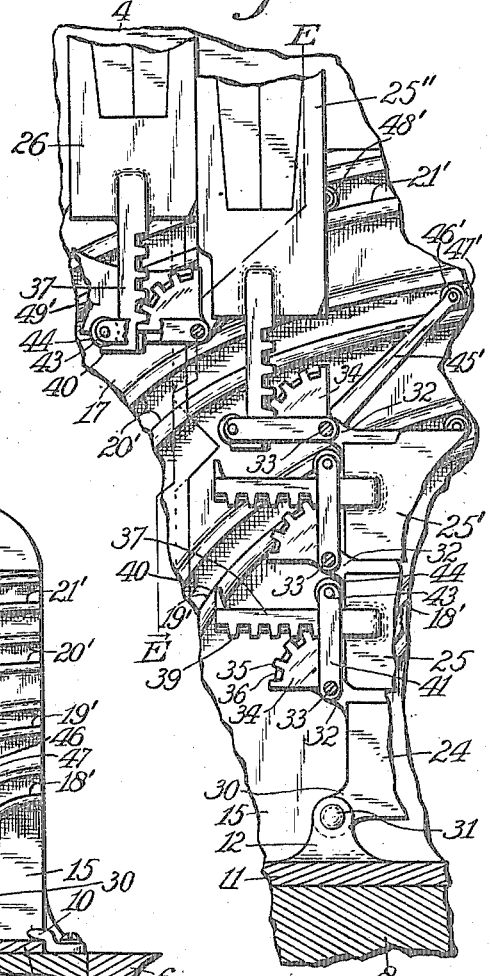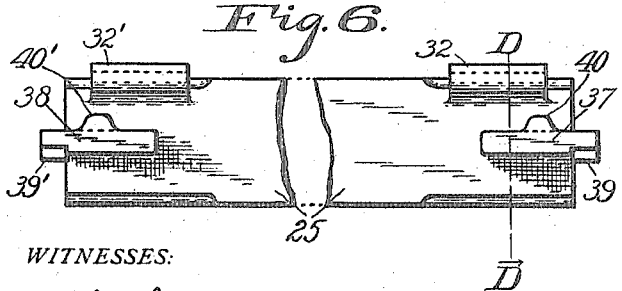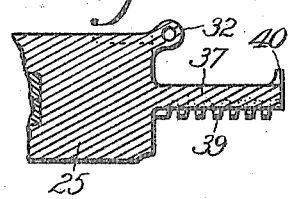

UNITED STATES PATENT OFFICE.

ELLIS T. SILVIUS, OF INDIANAPOLIS, INDIANA.

FILING APPLIANCE.

1,263,614.  Specification of Letters Patent.  Patented Apr. 23, 1918.

Application filed August 14, 1914. Serial No. 856,752.

*To all whom it may concern:*

Be it known that I, ELLIS T. SILVIUS, a citizen of the United States, residing at Indianapolis, in the county of Marion and State of Indiana, have invented a new and useful Filing Appliance, of which the following is a specification, reference being had to the accompanying drawings and to the letters and figures of reference marked thereon.

This invention relates to means for filing papers systematically and commonly known as filing cabinets or appliances, more particularly of the type that is employed in credit systems for taking care of bill or sale slips, the invention having reference more particularly to frames or leaves for holding the slips or other papers, and means for supporting and controlling the frames or leaves, more especially when it is designed that the frames or leaves shall normally stand uprightly in echelon and so as to be moved to prone position to form a rectangular pack.

An object of the invention is to provide a filing appliance of the above-mentioned character that shall be so constructed that the frames or leaves may be uprightly supported and prevented from falling rearward, in a simple manner, and so as to dispense with an equalizer or traveling abutment and separate supports therefor, a particular object being to provide such structure as to permit the use of otherwise necessary parts of the structure in a dual capacity whereby the frames or leaves are maintained in upright position when being moved forward or rearward when one or more of the forward leaves are moved to or from prone position.

Another object of the invention is to provide an improved construction in connections for filing frames or leaves that shall permit the latter to be moved either into echelon arrangement or into the form of a rectangular pack without requiring hinges of such character as to be adjustable relatively to the frame or leaf they support.

A still further object is to provide improved frame or leaf connections that shall permit of relatively longitudinal and also pivotal movement of the frames or leaves, and enable the forward one of a set of leaves to support all the remaining leaves together with a back support for them, and which shall be simple and yet strong and durable without requiring direct pivotal connection between the frames or leaves; another object also being to provide improved means for controlling the movement of the frames or leaves.

A further and more specific object of the invention is to provide an improved appliance which shall be adapted to support a set of filing frames or leaves either in a casing for operation or when removed from the casing to be cared for in a fireproof safe or vault.

The invention consists in a plurality of filing frames or leaves having means indirectly connecting them together for longitudinal and pivotal movement, each with respect to the other, an improved casing having controlling means with which the connecting means coöperate for controlling the frames or leaves, and a novel rest carried by the frames or leaves for preventing them from falling rearward; the invention consisting also further in the parts and combinations and arrangements of parts as hereinafter particularly described and further defined in the appended claims.

Referring to the drawings,—Figure 1 is a front elevation of a filing appliance or cabinet constructed substantially in accordance with the invention; Fig. 2 is a side elevation of the set of improved filing frames or leaves removed from their casing; Fig. 3 is a fragmentary section showing the frames or leaves in prone position as on the plane of the line A A on Fig. 1; Fig. 4 is a fragmentary section approximately on the line B B on Fig. 1; Fig. 5 is a fragmentary section showing a number of the frames in prone position and a number in upright position; Fig. 6 is a bottom plan or end view of one of the frames or leaves; Fig. 7 is a fragmentary section on the line D D on Fig. 6; Fig. 8 is a fragmentary section approximately on the line E E on Fig. 5; Fig. 9 is a fragmentary section on the line F F on Fig. 4; Fig. 10 is a fragmentary section with the frames in different positions as on the line G G on Fig. 8; Fig. 11 is a fragmentary section approximately on the line H H on Fig. 10; Fig. 12 is a fragmentary section on the line I I on Fig. 1; Fig. 13 is a perspective view of one of the controlling arms for the frames carrying a portion of the rest that maintains the leaves in upright position; Fig. 14 is a perspective view of one of the gear segments which coöperate to support the frames uprightly; Fig. 15 is a perspective view of one of the devices for connecting the frames together; Fig. 16 is a perspective view of one of the controlling arms; and, Fig. 17 is a fragmentary perspective view of one of the frames.

Similar reference characters on the different figures of the drawings indicate like elements or features of construction herein referred to in detail.

In practically carrying out the objects of the invention, a case adapted to constitute a part of the register or filing cabinet is provided and suitably comprises a bottom 1, a back 2 on the rear end of the bottom, sides 3 and 4 extending upward from the bottom and forward from the back, the forward portions of the sides being relatively low and having a front 5 on which is a top or lid 6 for supporting the frames or leaves when in prone position and conveniently serving as a desk-portion of the cabinet in which a drawer 7 is suitably arranged. The case includes a transverse rail or frame support 8 connected to the sides at a suitable distance forward of the back 2. The rear portion of the rail is provided with fixed bent fingers 9 and 9' and the forward portion of the rail is provided with a movable button 10.

The set of filing frames preferably being provided with a portable supporting frame, a base plate 11 is provided which is removably secured by the fingers 9 and 9' and the button 10 to the top of the rail 8, and it has two pivot stands 12 and 13 thereon for pivotally supporting the foremost one of the frames or leaves. Two guide plates 14 and 15 are fixed on the end portions of the base plate and normally extend upward on the inner sides of the sides 3 and 4 respectively of the case. The guide plates preferably have separate parts 16 and 17 respectively which are fixedly secured to the sides of the case against the rear edges of the main portions of the plates. One guide plate has curved guideways 18, 19, 20 and 21 on its inner side, the opposite guide plate having corresponding guideways 18', 19', 20' and 21'. The guideways preferably are irregularly curved substantially as shown. The tops of the guide plates 14 and 15 have notches 22 and 22' therein respectively that normally receive spring catches 23 and 23' which are mounted on the plate portions 16 and 17 respectively.

A suitable number of filing frames or leaves 24, 25, 25', 25'' and 26 are provided, the leaves being provided with suitable devices such as spring clamps 27, 27', whereby to removably hold papers on the frames or leaves. The forward upper portions of the frames preferably have indexing characters or numerals 28 and 29 thereon as is customary. The lower forward portion of the foremost frame 24 is provided with hinging ears 30 and 30' that are connected by means of pivots 31 and 31' to the stands 12 and 13 respectively, the connections preferably being permanent. The forward portion of the remaining frames are devoid of pivoting devices. The normal lower rear portion of each one excepting the rearmost one of the frames or leaves is provided with two pivoting ears 32 and 32' in which pivotal shafts 33 and 33' are respectively mounted. Novel gear segments 34 and 34' are provided and fixedly secured to the shafts respectively. The curved peripheral portions of the segments have gear teeth 35 and 35' thereon respectively, and the gear segments have also curved peripheral guide portions 36 and 36' respectively at one end of the gear teeth, the guide portions preferably corresponding to the pitch line of the gear teeth. The normal lower end of each one excepting the foremost one of the frames or leaves is provided with two guide bars 37 and 38 that extend downward and also laterally beyond the sides of the frames, the forward sides of the laterally extending portions having gear teeth 39 and 39' thereon respectively for engaging the teeth of the segments and constitute rack bars. The lower portions of the bars have stop projections 40 and 40' on the rearward side thereof respectively. The two rack bars of each frame are in engagement with and normally supported by the two segments that are mounted on the next adjacent forward frame or leaf, whereby the leaves are normally supported in upright position in stepped order, the rack bars being maintained in connection with the segments by novel yokes comprising links 41 and 42 connected to the shaft 33 and also to a pivot rod 43 having a roller 44 thereon, and similar links 41' and 42' connected to the shaft 33' and also to a pivot rod 43' having a roller 44' thereon. The yokes embrace the rack bars and the rollers are guided on the backs of the bars to normally rest on the stop projections. The shafts 33 and 33' are provided with controlling arms 45 and 45' respectively that are fixedly connected to the outer end portions of the shafts and are provided respectively with wrist pins 46 and 46' having rollers 47 and 47' respectively that are guided in the guideways provided on the guide plates 14 and 15 whereby the gear segments are prevented from rotating on their axes. The shafts 33 and 33' that are carried by the frame or leaf 25'', which is next adjacent to the rearmost one of the leaves, are provided with relatively stronger and heavier controlling arms 48 and 48' respectively that perform the functions of the other controlling arms but they preferably have other strong arms 49 and 49' integrally connected thereto respectively and extending rearward, the rear end portions being preferably provided with sockets 50 and 50' and connected to a tie-rod 51. Standards 52 and 52' are preferably removably mounted in the sockets and are thereby carried uprightly to constitute a rest for the back of the rearmost filing frame, the upper ends of the standards preferably having rollers or buffers 53 and 53' respectively. The arms 48 and 49, as will be seen, form a lever that is fulcrumed between its ends, the forward ends of the levers being controlled by the guideways 21 and 21'.

Various modifications may be made if desired, as for instance arms 45 and 45' may be substituted for the arms 48 and 48', and the rest for the back of the rearmost frame may be otherwise supported and controlled if desired, without departing from the spirit and intent of the invention.

In practice the frames or leaves are normally in upright position in echelon and all are bodily supported by the foremost one of the frames, one of the frames carrying the back rest for maintaining all the frames in normal position through the coöperation of the controlling arms with the guideways that are properly designed and arranged on the inner sides of the filing case. One or more of the frames or leaves may be drawn forward to prone position in order to gain access to the papers filed on the frames or leaves, and during the forward movement to prone position the rack bars roll on the gear segments and guide the yokes so that they are always radial relatively to the pivotal axes of the gear segments, as seen more clearly in Fig. 10. The rolling movement of the rack bars on the segments causes the leaves when in prone position to form a rectangular pack, since the leaves during their forward movement move downward and rearward relatively to the adjacent forward leaves. On return movement of the frames from prone to upright position the leaves are caused to move upward relatively to the adjacent forward frames or leaves and normally stand approximately in balanced position but inclined to tilt rearward by reason of the weight carried by the rearward portion of the leaves excepting the rearmost one, the tilting however being prevented by the back rest.

When it is desired to remove the frames from their case the button 10 is turned so as to release the base plate 11 after which the frames are moved to prone position. After releasing the catches 23 and 23' from the notches 22 and 22' respectively the base plate and the frames or leaves are removed together from the case and may be set upright as in Fig. 2, the upper or free ends of the frames being suitably clasped together if desired.

Having thus described the invention, what is claimed as new, is—

1. A filing appliance including a plurality of filing frames, means operatively connecting the frames for relative swinging movement, and a back rest for the rearmost frame pivotally carried by one of the other frames, with means for holding the back rest in upright position.

2. A filing appliance including a plurality of frames, and a series of coöperating devices operatively connecting each two adjacent frames together, including a rack bar carried by one frame, a gear segment carried by the other frame, and a yoke for holding the rack bar and segment in engagement with each other.

3. A filing appliance including a plurality of frames, a toothed rack bar fixed on one of the frames, a toothed segment pivoted to another one of the frames, and a yoke movably connected with the segment and the rack bar for retaining the bar in connection with the segment.

4. A filing appliance including a plurality of filing frames, and means for connecting each two adjacent frames together, enabling the frames to roll, either one relatively to the other for effecting longitudinal and also swinging movement of one relatively to the other of the frames, said means including a member on one frame and devices on the other frame having gearing and sliding engagement with said member.

5. A filing appliance including a plurality of frames, one frame having a toothed rack bar thereon, another one of the frames having a toothed segment and also a yoke pivoted thereto, the segment being in engagement with the rack bar, the yoke being guided by the rack bar and retaining the bar in engagement with the segment.

6. A filing appliance including a plurality of collocated filing frames and a plurality of coöperating devices operatively connecting each two adjacent frames together including a combined guiding and controlling bar on one of the frames, and two different connecting devices connected by a common pivot to the adjacent one of the frames and having rolling connection with opposite sides of the combined guiding and controlling bar.

7. A filing appliance including a plurality of filing frames, means operatively connecting and guiding the frames for relative swinging and longitudinal movement, and a back rest for the rearmost frame carried by one of the other frames and controlled by the guiding means.

8. A filing appliance including a plurality of collocated frames, the foremost one of the frames being pivotally supported, movable means for operatively connecting the frames together for relative swinging and longitudinal movement, controlling means for the movable means, and a back rest behind the rearmost one of the frames and pivotally supported and carried by another one of the frames, the back rest being operatively connected with the controlling means.

9. A filing appliance including a case, a plurality of collocated upright frames, a base plate pivoted to and supporting the foremost one of the frames, rack bars and gear segments coöperating together and provided with movable yokes connecting the frames operatively together for relatively swinging and longitudinal movement, guide plates fixed on the base plate and having guideways thereon, and controlling arms fixed to the gear segments and guided by the guideways.

10. A filing appliance including a case, guideways fixed in the case, a plurality of uprightly collocated frames of which the foremost one is pivotally supported in the case, rack bars and gear segments and also yokes coöperating together and operatively connecting the frames together for relatively swinging and longitudinal movement, controlling arms fixed to the segments and guided by the guideways, one of the arms having a rearward extending rest-supporting arm thereon, and a back rest removably connected to and carried solely by the rest-supporting arm, the back rest extending behind the rearmost one of the frames.

11. A filing appliance including a case, a base plate secured in the case, guide plates fixed on the base plate and having separate portions secured to the case, the guide plates having guideways thereon, means for detachably securing the guide plates to the separate portions thereof, a plurality of collocated frames, means pivotally connecting the foremost one of the frames to the base plate, rack bars and gear segments and also yokes coöperating together and operatively connecting the frames together for relatively swinging and longitudinal movement, and controlling arms fixed to the gear segments and guided by the guideways.

12. A filing appliance including a case comprising sides, guideways on the sides, a plurality of collocated frames of which the foremost is pivotally supported in the case, each frame excepting the rearmost one having a toothed segment and also a yoke pivoted thereto to swing on one and the same axis, the yoke extending beyond the segment, each frame excepting the foremost one having a toothed rack bar fixed thereon that extends between the segment and the yoke and meshes with the segment, controlling arms fixedly connected with the segments and guided by the guideways respectively, one of the arms having a rearward extending rest-supporting arm thereon, and a back rest for the rearmost frame uprightly supported by the rest-supporting arm.

13. In a filing appliance, the combination with two adjacent filing frames, a toothed gear segment pivotally connected to one of the frames, and a toothed rack bar fixed on the remaining one of the frames in mesh with the segment, of a yoke pivotally connected with the segment and embracing the rack bar, the yoke having a roller thereon guided by the bar and guiding the yoke, for connecting the frames together for relatively longitudinal and swinging movement.

14. In a filing appliance, the combination with a plurality of uprightly collocated filing frames, and means operatively connecting the frames one to another for relatively longitudinal and swinging movement, of movable means for controlling the longitudinal movement during swinging movement and provided with rest-supporting means, and a back rest solely supported by the rest-supporting means and extending behind the rearmost one of the frames.

15. In a filing appliance, the combination of a plurality of collocated filing frames, one of the frames having a toothed bar fixed thereon, the next adjacent one of the frames having a pivotal shaft thereon, a toothed segment and also a yoke connected to the shaft, the segment being in mesh with the bar, the yoke having a roller in movable contact with the bar for retaining the bar in mesh with the segment.

16. In a filing appliance, the combination of a plurality of filing frames uprightly collocated, pivots for supporting the foremost one of the frames, and means coöperating to enable one of each two adjacent frames to support the other including a fixed toothed device on one frame, a controlled toothed device on the other frame and a yoke for retaining the devices in coöperative relation each with the other.

17. In a filing appliance, the combination of a plurality of filing frames, yokes carried by the frames, and gearing devices coöperating with two adjacent ones of the frames and retained in coöperative relation, each device with the other, by the adjacent yoke, for connecting the frames one to another.

18. In a filing appliance, the combination with a plurality of filing frames having toothed bars thereon, and toothed segments mounted on the frames in mesh with the bars of adjacent frames, of means slidably engaging and coöperating with the bars for retaining the bars in meshing connection with the segments.

19. In a filing appliance, the combination of a plurality of collocated filing frames having toothed supporting bars rigidly fixed thereon, segments pivotally connected to the frames and having teeth and curved peripheral guides at one side of the teeth, and means for retaining the segments in contact with the bars of adjacent frames.

In testimony whereof, I affix my signature in presence of two witnesses.

ELLIS T. SILVIUS.

Witnesses:
J. H. GARDNER,
M. E. SPARROW.

Copies of this patent may be obtained for five cents each, by addressing the "Commissioner of Patents, Washington, D. C."